United States Patent
Goka

(10) Patent No.: US 7,317,979 B2
(45) Date of Patent: Jan. 8, 2008

(54) SPEED CHANGE CONTROL SYSTEM OF AUTOMOTIVE AUTOMATIC TRANSMISSION

(75) Inventor: Hitoshi Goka, Aichi (JP)

(73) Assignee: Jatco Ltd, Shizuoka (JP)

( * ) Notice: Subject to any disclaimer, the term of this patent is extended or adjusted under 35 U.S.C. 154(b) by 457 days.

(21) Appl. No.: 10/994,413

(22) Filed: Nov. 23, 2004

(65) Prior Publication Data

US 2005/0125128 A1    Jun. 9, 2005

(30) Foreign Application Priority Data

Nov. 27, 2003    (JP)    ............................. 2003-397934

(51) Int. Cl.
*F16H 61/02*    (2006.01)
*F16H 61/06*    (2006.01)
*G06F 17/00*    (2006.01)

(52) U.S. Cl. .......................................... 701/60; 477/97
(58) Field of Classification Search ...................... None
See application file for complete search history.

(56) References Cited

U.S. PATENT DOCUMENTS 5,209,332 A * 5/1993 Okayasu .................... 192/69.4
6,176,812 B1 * 1/2001 Taki et al. ................... 477/159
2005/0170930 A1 * 8/2005 Fett et al. ..................... 477/109

FOREIGN PATENT DOCUMENTS

JP    5-322027 A    12/1993

* cited by examiner

*Primary Examiner*—Michael J. Zanelli
(74) *Attorney, Agent, or Firm*—Foley & Lardner LLP

(57) ABSTRACT

In a speed change control system of an automatic transmission incorporated with an engine, there are provided a speed change mechanism that is able to establish a forward speed or a reverse by engaging a hydraulically operated friction element upon switching of the transmission from a non-travel range to a travel range; and a control unit that controls the hydraulically operated friction element in such a manner that a hydraulic pressure applied to the friction element is feedback controlled in such a manner that when the engine is under a lower load condition, a rate of speed change of rotation of an input shaft of the transmission has a first target rate. The control unit is configured to set the rate of speed change of the input shaft to a second target rate smaller than the first target rate when, upon switching of the transmission from the non-travel range to the travel range, the engine is under a higher load condition; and configured to control the hydraulic pressure of the friction element in a feedback control manner so that the rate of speed change of the input shaft has the second target rate.

13 Claims, 5 Drawing Sheets

SPEED CHANGE CONTROL SYSTEM OF AUTOMOTIVE AUTOMATIC TRANSMISSION

BACKGROUND OF THE INVENTION

1. Field of the Invention

The present invention relates to speed change control systems of automotive automatic transmissions. More specifically, the present invention relates to the speed change control systems of a type that is constructed to suppress or at least minimizes a select shock of the transmission that would occur when a select operation takes place under a higher load condition of an associated engine.

2. Description of the Related Art

In order to clarify the task of the present invention, the related art of the speed change control systems of such type will be described before describing the details of the invention.

In general, in an automotive automatic transmission including a planetary gear unit and a torque converter, there are employed various friction elements such as hydraulic multiple disc clutches, hydraulic brakes and the like. Upon shifting, some of the friction elements are selected by a controller and brought into their engaged condition providing the transmission with a desired speed or a reverse.

That is, for example, when, with an associated motor vehicle being at a standstill, a select lever is shifted from N (neutral)-range to D (drive)-range (which will be referred to as "N-D selection" hereinafter), the controller brings a first-speed corresponding clutch into an engaged condition to establish $1^{st}$ speed in the transmission. In this case, the hydraulic pressure for the $1^{st}$ speed corresponding clutch is feedback controlled by the controller in such a manner that a rate of change "dNt" of an input shaft rotation speed "Nt" has a target value "dNti" and the input shaft rotation speed is reduced to a synchronized $1^{st}$ speed "N1". Usually, the target rate of speed change "dNti" is set to such a fixed value as to produce no select shock and establish the speed change operation as fast as possible. The fixed value has been previously stored in a memory of the controller. When it is detected that the input shaft rotation speed "Nt" shows the synchronized $1^{st}$ speed "N1", the controller engages the $1^{st}$ speed corresponding clutch completely thereby to complete the shift change to $1^{st}$ speed.

Measures for improving the operation of such shift change of N-D selection are described in Japanese Laid-open Patent Application (Tokkaihei) 5-322027. The measures disclosed by this published application pay attention to a change in time that is needed for completing the shift change in accordance with the input shaft rotation speed "Nt" at a start timing of the shift change in case wherein the target rate of speed change "dNt" of the input shaft is set to a fixed value at the time of the N-D selection. In the measures, for making the time needed for completing the shift change constant irrespective of the rotation speed of the input shaft at the N-D selection, the target rate of speed change "dNt" of the input shaft is set in accordance with the input shaft rotation speed "Nt" at the start timing of the N-D selection.

According to the measures, the time needed for completing the shift change at the N-D selection can have a generally constant value, and thus, a shift feeling is fairly improved.

For actuating the clutches, a hydraulic power system is used. That is, each clutch is connected to a hydraulic power source through an oil passage and an electromagnetic valve (or solenoid valve) is installed in the oil passage. For controlling the hydraulic pressure fed to the clutch, the electromagnetic valve is subjected to a duty-control.

However, due to the inherent construction of the hydraulic power system, a feedback control for the clutches produces a pulsation in the fluid in the oil passage due to ON/OFF operation of the electromagnetic valves, and thus a hydraulic fluctuation is inevitably produced. Usually, for treating such hydraulic fluctuation, accumulators are provided for respective clutches in the hydraulic circuit.

SUMMARY OF THE INVENTION

As is known, in a cold and higher load condition, an automotive internal combustion engine incorporated with a transmission of the above-mentioned type tends to show a higher rotation speed (viz., speed higher than a normal speed) thereof and thus higher rotation speed of the input shaft of the transmission. Such cold and higher load condition is induced for instance just after cold starting of the engine, that is, for the time when for promoting a temperature increase of a catalyst in an exhaust system, the ignition timing of the engine is kept retarded. As is known, the temperature increase of the catalyst aims to increase an exhaust purification performance of the catalyst.

For facilitating the description, the phenomenon wherein a higher rotation speed of the engine appears due to cold and higher load condition of the engine will be referred to as "higher speed phenomenon" in the following.

In case wherein the engine and thus the input shaft of the transmission tend to show the higher speed phenomenon, the shift change of N-D selection needs a clutch pressure (viz., hydraulic pressure needed for actuating the clutch) that is higher than a normal one, which brings about such a possibility that the clutch pressure exceeds the capacity of the associated accumulator. When the clutch pressure exceeds the accumulator capacity, the hydraulic fluctuation of the clutch pressure is not sufficiently suppressed by the accumulator, and thus, the clutch pressure is left unstable. Furthermore, due to this unstable clutch pressure, the response of the hydraulic pressure to the duty-control instruction becomes sensitive and thus, the speed control of the input shaft becomes rough, that is, the rotation of the input shaft is excessively restricted or excessively released, resulting in that the undesired select shock is not sufficiently eliminated.

The above-mentioned drawbacks will be clearly understood from the following description when taken in conjunction with time charts of FIGS. 7A, 7B, 7C and 7D of the accompanying drawings. In these time charts, the abscissa shows an elapsed time. As will be seen from the time chart of FIG. 7B, when, at time "t1", N-D selection is detected by the controller, the duty ratio of the solenoid valve is changed from 100% to 0% and kept at 0% for a given time. At the duty ratio of 100%, the pressure feeding passage is fully closed and at the duty ratio of 0%, the passage is fully opened.

Keeping the duty ratio at 0% for the given time is for reducing a clearance between adjacent drive and driven plates, that is, for inducing a so-called rattle free condition wherein the drive and driven plates are brought close to each other by a degree at which a friction is about to be produced therebetween. Thereafter, the duty ratio of the solenoid valve is feedback controlled for causing the rate of speed change "dNt" of the input shaft rotation speed "Nt" to have the target value "dNti", and thus, as is seen from the time chart of FIG. 7A, the rotation speed "Nt" of the input shaft is gradually reduced.

While, when, upon the N-D selection, the engine incorporated with the transmission shows the higher speed phenomenon and thus the clutch pressure exceeds the capacity of the associated accumulator, a real rate of speed change of the input shaft rotation is forced to largely fluctuate relative to the target value "dNti" as is seen from the time chart of FIG. 7D, and thus, as is seen from the time chart of FIG. 7C, a marked fore-and-aft G, that is, the engaging shock of the clutch is induced.

Accordingly, an object of the present invention is to provide a speed change control system of an automotive automatic transmission, which is free of the above-mentioned drawbacks.

That is, in accordance with the present invention, there is provided a speed change control system of an automotive automatic transmission, which can suppress or at least minimize a shift shock that would be produced when the N-D select operation takes place under a higher load condition of an associated internal combustion engine.

In accordance with a first aspect of the present invention, there is provided a speed change control system of an automatic transmission incorporated with an engine. The speed change control system comprises a speed change mechanism that is able to establish a forward speed or a reverse by engaging a hydraulically operated friction element upon switching of the transmission from a non-travel range to a travel range; and a control unit that controls the hydraulically operated friction element in such a manner that a hydraulic pressure applied to the friction element is feedback controlled in such a manner that when the engine is under a lower load condition, a rate of speed change of rotation of an input shaft of the transmission has a first target rate, the control unit being configured to carry out setting the rate of speed change of the input shaft to a second target rate smaller than the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

In accordance with a second aspect of the present invention, there is provided a speed change control system of an automatic transmission powered by an internal combustion engine through a torque converter. The speed change control system comprises a speed change mechanism that is able to establish a forward speed or a reverse of the transmission by feeding a hydraulic pressure to a hydraulically operated fiction element upon switching of the transmission from a non-travel range to a travel range, the feeding of the hydraulic pressure to the friction element being carried out through an oil passage to which an accumulator is connected; and a control unit that controls the hydraulic pressure to the friction element in such manner that when the engine is under a lower load condition, a rate of speed change of ration of an input shaft of the transmission has a first target rate, the input shaft being connected to a turbine of the torque converter; the control unit being configured to carry out setting the rate of speed change of the input shaft to a second target rate smaller than the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

In accordance with a third aspect of the present invention, there is provided, in an automotive automatic transmission having a speed change mechanism that is able to establish a forward speed or a reverse by feeding a hydraulic pressure to a hydraulically operated friction element upon switching of the transmission from a non-travel range to a travel range, a method of controlling the speed change mechanism. The method comprises setting a rate of speed change of ratio of rotation of an input shaft of the transmission to a first target rate when the engine is under a lower load condition, setting the rate of speed change of the input shaft of the transmission to a second target rate lower the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 1:
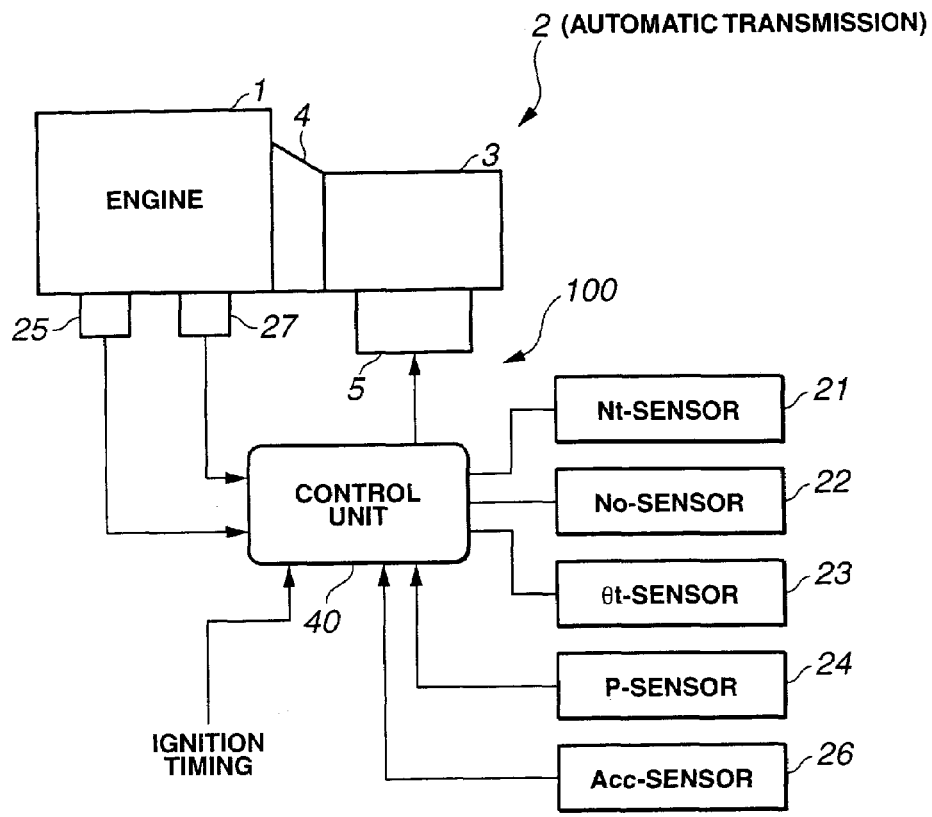
FIG. 1 is a schematic diagram of a speed change control system of an automotive automatic transmission, which is an embodiment of the present invention.

Referring to FIG. 1, there is schematically shown a speed change control system 100 of an automotive automatic transmission 2 incorporated with an internal combustion engine 1. An output of the engine 1 is transmitted to drive road wheels (not shown) through the transmission 2.

The automatic transmission 2 generally comprises a torque converter 4 that is powered by an output shaft (or crankshaft) of the engine 1, a planetary gear type speed change mechanism 3 that is powered by an output element (viz., turbine) of the torque converter 4 and a hydraulic circuit 5 that actuates various friction elements of the speed change mechanism 3 with a hydraulic power.

The speed change control system 100 of the invention comprises a control unit 40 that controls the speed change mechanism 3 through the hydraulic circuit 5 in accordance with various external conditions.

The control unit 40 is a microcomputer that comprises a central processing unit (CPU), a random access memory (RAM), a read only memory (ROM) and input and output interfaces. In practical use, a counter serving as a timer is incorporated with the control unit 40.

The speed change mechanism 3 comprises for example a planetary gear unit that enables the transmission 2 to have four forward speeds and one reverse, and a plurality of friction elements, such as hydraulic clutches and hydraulic brakes, that vary the operation condition of the planetary gear unit for allowing the transmission 2 to assume a desired speed or reverse.

As is described hereinabove, the speed change mechanism 3 is controlled by the control unit 40. That is, based on instruction signals from the control unit 40, the operation of the speed change mechanism 3 is carried out.

As shown in FIG. 1, a turbine speed sensor 21, a transfer drive gear speed sensor 22, a throttle open degree sensor 23, a selected range detecting position sensor 24, an engine speed sensor 25, an accelerator open degree sensor 26 and an engine cooling water temperature sensor 27 are connected to the control unit 40 to feed the same with their respective information signals. That is, the turbine speed sensor (or Nt-sensor) 21 senses a rotation speed "Nt" of a turbine (viz., input shaft) of the torque converter 4, the transfer drive gear speed sensor (or No-sensor) 22 senses a rotation speed "No" of a drive gear of a transfer (not shown), the throttle open degree sensor (or θt-sensor) 23 senses an opening degree "θt" of a throttle valve installed in an air intake passage of the engine 1, the selected range detecting sensor (or P-sensor) 24 senses a speed range (or position) that is selected by a select lever (not shown) of the transmission 2, the engine speed sensor 25 senses a rotation speed "Ne" of the engine 1 and the accelerator open degree sensor (or Acc-sensor) 26 senses an open degree "Acc" of an accelerator (not shown), and the cooling water temperature sensor 27 detects the temperature of a cooling water flowing in a water jacket of the engine 1. The information on the ignition timing may be provided by an engine controller that controls the operation of the engine 1. The selected range detecting sensor 24 may be of an inhibitor switch. In the control unit 40, a vehicle speed "V" is derived from the transfer drive gear speed "No", and thus, the No-sensor 22 serves also as a vehicle speed sensor.

Figure 2:
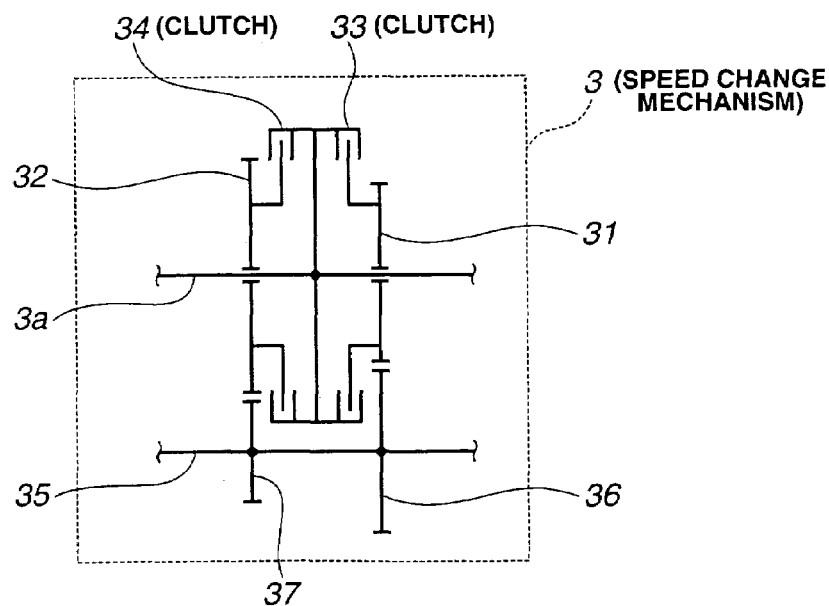
FIG. 2 is a schematic view of a speed change mechanism of the automotive automatic transmission to which the speed change control system of the invention is practically applied.

In the following, operation of the speed change mechanism 3 will be described with reference to FIG. 2.

For ease of understanding, the following explanation will be directed to a speed change mechanism of a parallel double shaft type in place of the planetary gear type.

As is understood from the drawing, around an input shaft 3a of the speed change mechanism 3, there are rotatably arranged a first drive gear 31 and a second drive gear 32. The input shaft 3a is connected to a turbine shaft of the above-mentioned torque converter 4. Between the first and second drive gears 31 and 32, there are arranged lower and higher speed side hydraulic clutches 33 and 34 which are secured to the input shaft 3a, as shown. That is, when the lower speed side hydraulic clutch 33 is engaged, the first drive gear 31 is connected to the input shaft 3a to rotate together therewith, while, when the higher speed side hydraulic clutch 34 is engaged, the second drive gear 32 is connected to the input shaft 3a to rotate together therewith.

An intermediate shaft 35 is arranged in parallel with the input shaft 3a. Although not shown in the drawing, the intermediate shaft 35 is connected to drive road wheels through a final speed reduction gear unit. To this intermediate shaft 35, there are fixed first and second driven gears 36 and 37 that are respectively meshed with the first and second drive gears 31 and 32, as shown.

Accordingly, when the lower speed side hydraulic clutch 33 is engaged, the rotation of the input shaft 3a is transmitted to the intermediate shaft 35 through the lower speed side hydraulic clutch 33 and the first drive and driven gears 31 and 36 and thus, establishes, for example, $1^{st}$ speed of the transmission 2. While, when the higher speed side hydraulic clutch 34 is engaged, the rotation of the input shaft 3a is transmitted to the intermediate shaft 35 through the lower speed side hydraulic clutch 34 and the second drive and driven gears 32 and 37 and thus, establishes, for example, $2^{nd}$ speed of the transmission 2.

Considering the above-mentioned arrangement of the speed change mechanism 3, an up-shift from $1^{st}$ speed to $2^{nd}$ speed is carried out in such a manner that with the lower speed side hydraulic clutch 33 being engaged, the clutch 33 is gradually disengaged while gradually engaging the higher speed side hydraulic clutch 34. While, a down-shift from $2^{nd}$ speed to $1^{st}$ speed is carried out in such a manner that with the higher speed side hydraulic clutch 34 being engaged, the clutch 34 is gradually disengaged while gradually engaging the lower speed side hydraulic clutch 33.

The construction of the lower and higher speed side hydraulic clutches 33 and 34 will be understood from the following description that is directed to the lower speed side hydraulic clutch 33. Since the higher speed side hydraulic clutch 34 has substantially the same construction as the lower speed side hydraulic clutch 33, explanation of the higher one will be omitted.

Figure 3:
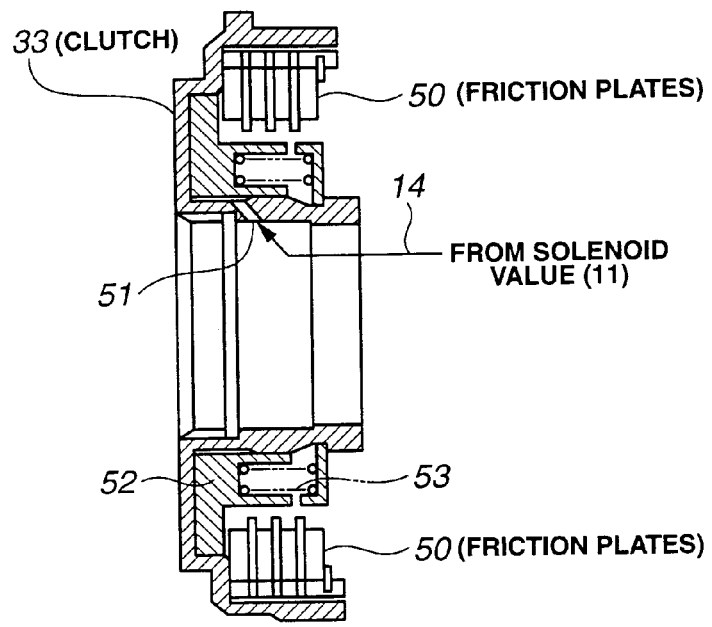
FIG. 3 is a schematic sectional view of a friction element employed in the automotive automatic transmission to which the speed change control system of the invention is applied.

In FIG. 3, there is shown in a sectional manner the lower speed side hydraulic clutch 33. As is seen from this drawing, the clutch 33 is of a hydraulic multiple disk type that is equipped with a plurality of friction plates 50. The friction plates 50 comprise a first group of friction plates that are integral with the input shaft 3a (see FIG. 2) and a second group of friction plates that are integral with the first drive gear 31 (see FIG. 2), the friction plates of the first and second groups being alternatively and closely arranged. When a hydraulic pressure is applied into a piston chamber defined in the clutch 33 from an oil passage 14 through a port 51, a piston 52 is moved rightward in the drawing against a force of a return spring 53 inducing a tightly compressed condition of the friction plates 50 thereby to cause the clutch 33 to take an engaged condition. While, when the hydraulic pressure is released from the piston chamber through the port 51, the piston 52 is moved leftward in the drawing by the return spring 53 inducing a loosed condition of the friction plates 50 thereby to cause the clutch 33 to take a disengaged condition.

It is to be noted that the piston 52 can have a so-called standby position where the engaged condition of the friction plates 50 is completely cancelled. That is, when the piston 52 takes the standby position, a sufficient clearance is provided between every adjacent friction plates for producing no drag torque in the friction pates 50. Accordingly, when the engaged condition of the clutch 33 is intended, the friction plates 50 have at first to move from the standby position to a so-called "critical position" where the above-mentioned clearance shows substantially zero, that is, a position just before the position where the friction plates 50 start to show a frictional engagement thereof. That is, at the "critical position", a so-called "rattle free condition" of the friction plates 50 is established. A time needed for establishing the "rattle free condition" will be called "rattle free needed time" hereinafter.

When, with the friction plates 50 being in the tightly compressed condition, disengaging operation for the same is started, the above-mentioned drag torque is kept generated for a while. Accordingly, in order to completely cancel the engaged condition of the clutch 33, it is necessary to consider a so-called "hydraulic release needed time" as a waste time that passes from a time when discharging of the hydraulic pressure from the piston chamber of the clutch 33 begins to a time when the drag torque completely disappears.

Although not shown in the drawing, elements (viz., hydraulic clutches, and drive and driven gears) for achieving $3^{rd}$ speed, $4^{th}$ speed and reverse have substantially the same arrangement as those in the above-mentioned speed change mechanism 3 for $1^{st}$ and $2^{nd}$ speeds. That is, by engaging the drive and driven gears through a corresponding hydraulic clutch, $3^{rd}$ speed, $4^{th}$ speed or reverse is established in the transmission 2. In a neutral condition, all of the friction elements for $1^{st}$, $2^{nd}$, $3^{rd}$ and $4^{th}$ forward speeds and reverse assume their disengaged condition. Thus, if, under this neutral condition, the hydraulic clutch 33 is brought into its engaged condition, the automatic transmission 2 is shifted to $1^{st}$ speed from the neutral condition.

In the following, the hydraulic circuit 5 will be described in detail with reference to FIG. 4.

The hydraulic circuit 5 has a plurality of electromagnetic valves (viz., solenoid valves) 11 respectively incorporated with the above-mentioned friction elements (viz., clutches and brakes). By controlling the solenoid valve 11 in ON/OFF manner (or duty control manner), charging/discharging of the hydraulic pressure to or from the corresponding friction element is controlled. Since the solenoid valves for the friction elements are all substantially the same in construction, the following description on the construction will be directed to only the solenoid valve 11 for the above-mentioned hydraulic clutch 33. Description on the other solenoid valves will be omitted.

Figure 4:
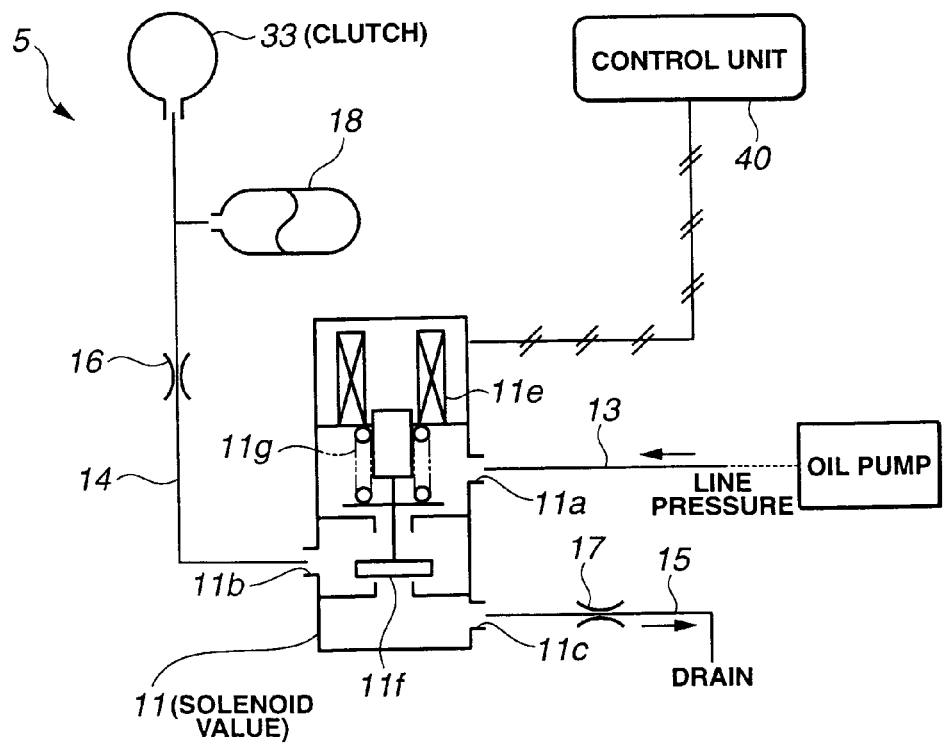
FIG. 4 is a schematic view of a hydraulic circuit employed in the speed change control system of the present invention.

As is shown in FIG. 4, the solenoid valve 11 is of a normally closed type having two work positions. As shown, the solenoid valve 11 has three, that is, first, second and third ports 11a, 11b and 11c which are respectively exposed to three chambers defined in a case of the solenoid valve 11.

To the first port 11a, there is connected a first oil passage 13 through which a hydraulic fluid is led toward the first port 11a from an oil pump (not shown). Although not shown in the drawing, the first oil passage 13 is equipped with a pressure regulation valve by which the pressure of the hydraulic fluid is regulated before being fed to the first port 11a. The regulated hydraulic pressure is called "line pressure".

To the second port 11b, there is connected a second oil passage 14 that leads to the hydraulic clutch 33. To the third port 11c, there is connected a third oil passage 15 that leads to an oil tank (not shown). These second and third oil passages 14 and 15 have orifices 16 and 17 respectively. The flow passage area of the orifice 16 of the second oil passage 14 is larger than that of the orifice 17 of the third oil passage 15. The second oil passage 14 has between the clutch 33 and the orifice 16 an accumulator 18 connected thereto.

As has been mentioned hereinabove, the accumulator 18 functions to damp a hydraulic fluctuation that would be inevitably produced in response to ON/OFF operation of the solenoid valve 11. Accordingly, normally, due to the function of the accumulator 18, the fluctuation of the hydraulic pressure is absorbed thereby stabilizing the hydraulic pressure supplied to the clutch 33.

The solenoid valve 11 is connected to the control unit 40 to be controlled. That is, the duty ratio of an instruction signal fed to the solenoid valve 11 is controlled at a given period (for example, at 50 Hz).

When a solenoid 11e of the solenoid valve 11 is deenergized, a valve body 11f functions to shut a communication between the second and third ports 11b and 11c and to establish a communication between the first and second ports 11a and 11b due to a force of a biasing spring 11g.

While, when the solenoid 11e of the solenoid valve 11 is energized, the valve body 11f functions to establish the communication between the second and third ports 11b and 11c and to shut the communication between the first and second ports 11a and 11b against the force of the biasing spring 11g. That is, when the duty ratio of the solenoid valve 11 shows 100%, the first oil passage 13 serving as a hydraulic pressure feeding passage becomes closed, and when the duty ratio shows 0%, the first oil passage 13 becomes open and thus a hydraulic pressure is supplied to the solenoid valve 11.

In the following, the detail of the present invention will be clearly described.

That is, in the speed change control system according to the present invention, a shift shock that would be produced when a select lever of the transmission 2 is moved from a non-travel range such as N-range or P-range to a travel-range such as D-range or R-range is assuredly suppressed or minimized even if the engine 1 is in its higher load condition. That is, as will become apparent from the following description, in the present invention, a unique control is applied to an operation process that is taken at the switch from the non-travel range to the travel range. For ease of description, such switching will be called "N-D selection" in the following description.

Upon detecting the N-D selection based on the information signal from the selected range detecting sensor 24 (see FIG. 1), the control unit 40 judges an existing operation condition of the engine 1. That is, based on the rotation speed "Ne" detected by the engine speed sensor 25, an ignition timing "IT" fed by an engine controller, the water temperature detected by the engine cooling water temperature sensor 27, and other information, the control unit 40 carries out a judgment as to whether the engine 1 is in a higher load condition or not.

When it is judged that the engine 1 is not in a higher load condition, that is, the engine 1 is under an idling condition, the control unit 40 controls the operation of the N-D selection in a normal control mode. That is, in this case, the hydraulic pressure of the $1^{st}$ speed corresponding clutch 33 is feedback controlled in such a manner that the rate of change "dNt" of the rotation speed "Nt" of the input shaft 3a (or turbine shaft of the torque converter 4) has a predetermined target value "dNtin" thereby to reduce the rotation speed of the input shaft 3a toward the synchronized $1^{st}$ speed "N1". When detecting that the rotation speed "Nt" of the input shaft 3a shows the synchronized $1^{st}$ speed "N1", the control unit 40 completely engages the first speed corresponding clutch 33 thereby to complete the shift change to $1^{st}$ speed.

While, when it is judged that the engine 1 is in a higher load condition, the control unit 40 controls the operation of the N-D selection in a higher load corresponding control mode. A higher load condition of the engine 1 assumed when the transmission 2 takes the non-travel range (viz., neutral condition) is likely provided just after the cold engine starting. This is because, just after the cold engine starting, the engine 1 is subjected to a fast idling speed for quickly increasing the temperature of the engine 1 and subjected to a retarded ignition control for quickly increasing the temperature of a catalyst installed in an exhaust system of the engine 1. In addition to these reasons, the higher load condition of the engine 1 is likely provided when a driver shifts the select lever from N-range to D-range while depressing the accelerator.

When the control unit 40 judges that the engine 1 is in a higher load condition, there is set a second target rate of speed change "dNtib" (<dNtin) that is smaller than the above-mentioned predetermined target value "dNtin" (<0). It is to be noted that the absolute value of the second target rate of speed change "dNtib" is larger than that of the predetermined target value "dNtin". And at the same time, the hydraulic pressure of the 1$^{st}$ speed corresponding clutch 33 is feedback controlled in such a manner that the rate of the change "dNt" of the rotation speed "Nt" of the input shaft 3a has the second target rate of speed change "dNtib".

The reason of setting the second target rate of speed change "dNtib" that is smaller than the predetermined target value "dNtin" is as follows.

That is, in a higher load condition of the engine 1, the engine rotation speed "Ne" and the turbine speed "Nt" tend to show the higher speed phenomenon. As is known, in order to carry out the N-D selection in such condition, it becomes necessary to provide a clutch pressure that is higher than a normal clutch pressure.

In view of the above, in accordance with the present invention, the following measures are employed.

That is, when, with the engine 1 being in a higher load condition, the N-D selection is made, a second target rate of speed change "dNtib" is set that is smaller than a predetermined target rate of speed change "dNtin" set in a normal control mode, so that the hydraulic pressure is quickly increased to suppress the possibility of the higher speed phenomenon of the turbine shaft 3a. Due to suppression of the higher speed phenomenon of the turbine shaft 3a, a shock inevitably produced when the hydraulic clutch 33 is engaged is expected to be damped or minimized.

Even when the turbine rotation speed is feedback controlled by setting the second target rate of speed change like the above, it may occur that the hydraulic fluctuation of the clutch 33 exceeds the capacity of the accumulator 18. If the hydraulic fluctuation exceeds the capacity of the accumulator 18, the pressure for the clutch 33 exerted at a downstream side of the accumulator 18 becomes unstable, and the work of the hydraulic pressure relative to a control input (viz., duty-control instruction) becomes sensitive. In this case, it tends to occur that the rotation of the input shaft 3a is excessively restrained or excessively released making the engaged condition of the clutch 33 unstable, resulting in that the undesired select shock is not sufficiently suppressed.

For dealing with such undesired tendency, during a time for which the rate of speed change "dNt" of the input shaft (or turbine shaft) 3a is feedback controlled based on the second target rate of speed change "dNtib", a higher speed phenomenon judgment is carried out. That is, during such time, judgment is carried out as to whether the turbine speed (viz., the speed of the turbine shaft 3a) shows a tendency of the higher speed phenomenon or not.

Thus, in the control unit 40, the higher speed phenomenon judgment is carried out based on a deviation (or difference) "ec" (=dNtib−dNt) between the target rate of speed change (or target rate of turbine speed change) "dNtib" and a real rate of speed change (or real rate of turbine speed change) "dNt". That is, when, after changing of the deviation "ec" from a positive value to a negative value, the deviation "ec" becomes lower than a given value "dNta", for example, −10 rpm/sec, it is judged that the turbine shaft 3a shows the tendency of the higher speed phenomenon.

When it is judged that the turbine shaft 3a shows the tendency of the higher speed phenomenon, the feedback control is immediately stopped, and then an open loop control is started. This is because even when the tendency of higher speed phenomenon is detected, the higher speed of the turbine shaft 3a can not be suppressed by the feedback control, and thus, in this case, the controlled object (or factor) is switched from the rate of speed change of the turbine shaft 3a to a rate of pressure change of the clutch 33, and the open loop control is carried out in a manner to increase the rate of pressure change at a constant rate thereby to assuredly suppress the higher speed phenomenon of the turbine shaft 3a.

In this open loop control, the control signal directed to the solenoid valve 11 is produced based on data that have been previously stored in the memory of the control unit 40. That is, in advance, through tests, data on the duty ratio of the solenoid valve 11 that cause the clutch pressure to increase at a given rate are obtained and stored in the memory of the control unit 40. When it is judged that the turbine shaft 3a shows such a tendency of higher speed phenomenon, switching is carried out from the feedback control that controls the open degree (viz., duty ratio) of the solenoid valve 11 of the 1$^{st}$ speed corresponding clutch 33 so as to cause the rate of speed change "dNt" of the turbine shaft 3a to have the second target rate of speed change "dNtib" to the open loop control that controls the open degree of the solenoid valve 11 based on the data that has been previously stored in the memory of the control unit 40. As has been mentioned hereinabove, the data stored in the memory has such a characteristic as to increase the clutch pressure at a constant rate.

In the following, programmed operation steps executed by the control unit 40 in case of the N-D selection will be described in detail with reference to a flowchart of FIG. 6 and time charts of FIGS. 5A to 5D.

Figure 5A:
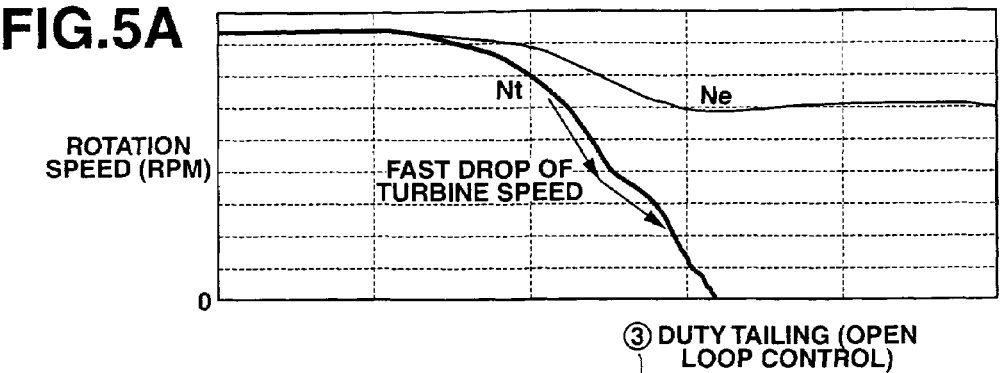
FIGS. 5A to 5D are time charts that depict control characteristics exhibited by the speed change control system of the present invention.
Figure 5B:
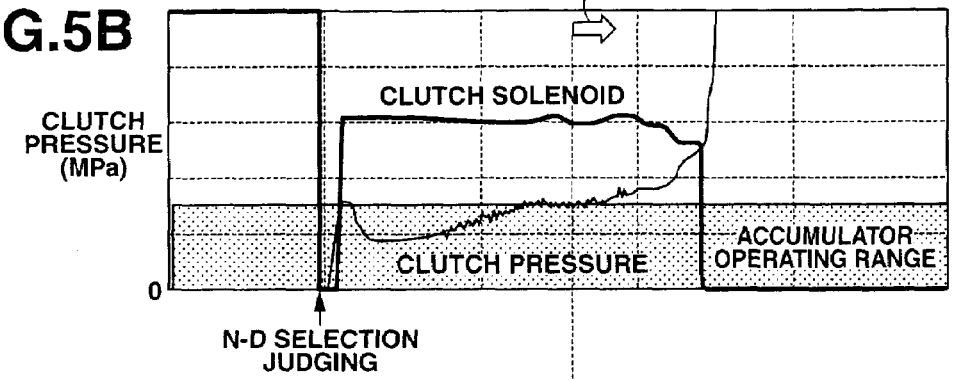
Figure 5C:
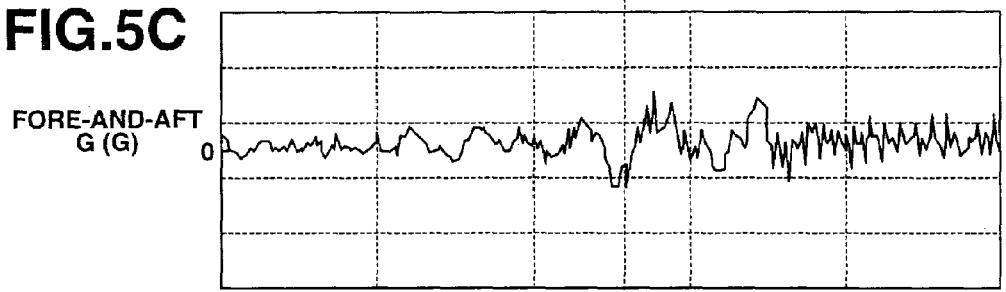
Figure 5D:
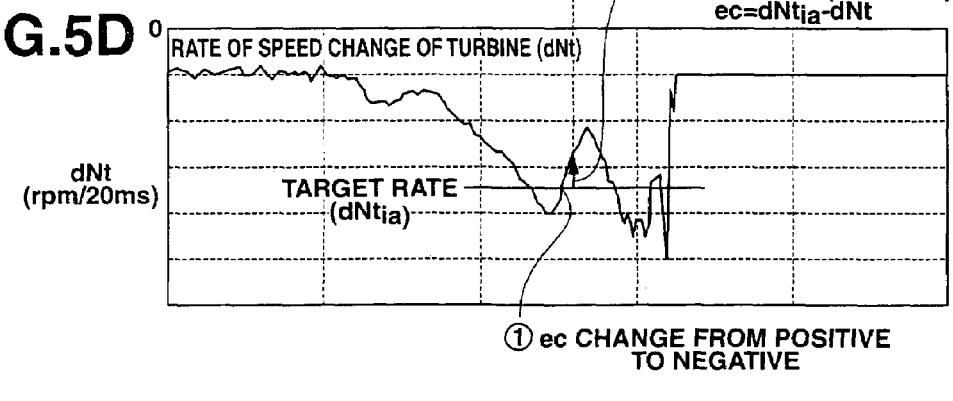

FIG. 5A shows a change of the engine speed "Ne" and that of the turbine speed "Ne", FIG. 5B shows a change of the hydraulic pressure applied to 1$^{st}$ speed corresponding clutch 33, FIG. 5C shows a change of a fore-and-aft G (acceleration), and FIG. 5D shows a change of the rate of speed change of the turbine shaft 3a.

Figure 6:
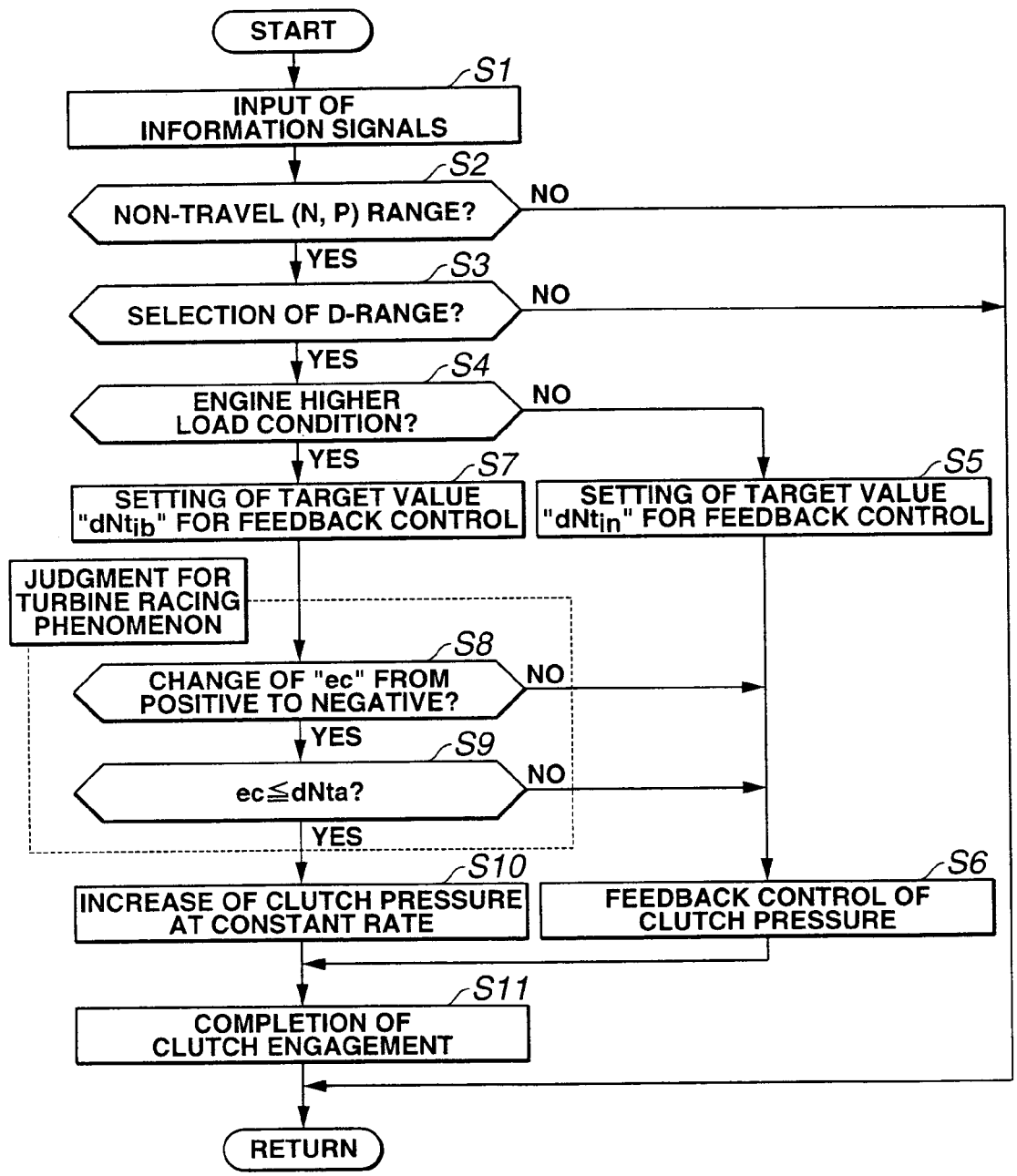
FIG. 6 is a flowchart showing programmed operations steps executed by a control unit employed in the speed change control system of the present invention.

In the flowchart of FIG. 6, at step S1, information signals are inputted from the various sensors. At step S2, judgment is carried out as to whether the select lever of the transmission 2 is at the non-travel range (viz., N-range or P-range) or not. If NO, that is, when the select lever is not at the non-travel range, the operation flow returns, while if YES, that is, when the select lever is at the non-travel range, the operation flow goes to step S3. At this step S3, judgment is carried out as to whether the select lever of the transmission 2 has been moved to the travel range (viz., D-range or R-range).

If YES at step S3, that is, when it is judged that the select lever has been moved from the non-travel range to the travel range, that is, when N-D selection is judged, the operation flow goes to step S4. While, if NO at step S3, the operation flow returns.

At step S4, judgment is carried out as to whether the engine 1 is in a higher load condition or not. If NO, that is, when it is judged that the engine 1 is not in a higher load condition, the operation flow goes to step S5. At this step S5, a predetermined rate of speed change "dNtin" (<0) of the turbine shaft 3a is set as a target value in the feedback control. Then, at step S6, the hydraulic pressure for the 1$^{st}$ speed corresponding clutch 33 is feedback controlled in such a manner that the rate of speed change "dNt" of the turbine shaft rotation speed "Nt" has the target value "dNtin". Then, at step S11, the turbine rotation speed "Nt" is forced to show the synchronized 1$^{st}$ speed "N1" to complete the engagement of the clutch 33.

While, if YES at step S4, that is, when it is judged that the engine 1 is in a higher load condition, the operation flow goes to step S7. In this case, with judgment of "N-D" selection, the duty ratio of the solenoid valve 11 of the 1$^{st}$ speed corresponding clutch 33 that has been released is temporarily set 0%, as is seen from the time chart of FIG. 5B. With this, hydraulic pressure is fed to the clutch 33 allowing the clutch 33 to have the rattle free condition. Furthermore, as a target rate of speed change of the turbine shaft 3a, the above-mentioned second target rate of speed change "dNtib" (<0) that is smaller than the above-mentioned predetermined target value "dNtin" is set and at the same time, the duty ratio of the solenoid valve 11 of the 1$^{st}$ speed corresponding clutch 33 is feedback controlled in such a manner that the rate of speed change "dNt" of the speed "Nt" of the turbine shaft 3a has the target rate of speed change "dNtib". With this feedback control, the turbine speed "Nt" is reduced fast as is indicated by the arrows in the time chart of FIG. 5A, and as is seen from the time chart of FIG. 5D, the real rate of speed change "dNt" of the speed "Nt" of the turbine shaft 3a is reduced toward the target value "dNtib".

Referring back to the flowchart of FIG. 6, the operation flow goes to steps S8 and S9 where a higher speed phenomenon of the turbine shaft 3a is judged. That is, at step S8, judgment is carried out as to whether or not the deviation "ec" between the target rate of speed change "dNtib" and the real rate of speed change "dNt" has changed from positive to negative. If YES, that is, when it is judged that the deviation "ec" has changed from positive to negative, the operation flow goes to step S9. At this step S9, judgment is carried out as to whether the deviation "ec" is equal to or smaller than a given value "dNta", for example, −10 rpm/sec, or not.

If YES at step S9, that is, when it is judged that the deviation "ec" is equal to or smaller than the given value "dNta", the operation flow goes to step S10, stopping the feedback control. At step S10, the open loop control is carried out by which the clutch pressure is increased at a given rate. Then, at step S11, the engagement of the clutch 33 is completed.

That is, as is understood from the time chart of FIG. 5B, when the clutch pressure exceeds the capacity (or functioning range) of the accumulator 18, the clutch pressure become unstable and thus the rate of speed change of the turbine shaft 3a fluctuates. Accordingly, as is seen from the time chart of FIG. 5D, after falling below the target rate of speed change "dNtib", the real rate of speed change "dNt" of the turbine shaft 3a becomes larger than the target rate "dNtib". This means that the deviation "ec" between the target rate of speed change "dNtib" and the real rate of speed change "dNt" changes from positive to negative. When, after the change from positive to negative, the deviation "ec" becomes lower than the given value "dNta", it is judged that the turbine shaft 3a shows the tendency of higher speed phenomenon. Upon this judgment, the control is changed from the feedback control wherein the rate of speed change of the turbine shaft 3a is based on the control to the open loop control wherein the hydraulic pressure of the clutch 33 is increased at a given rate.

Figure 7A:
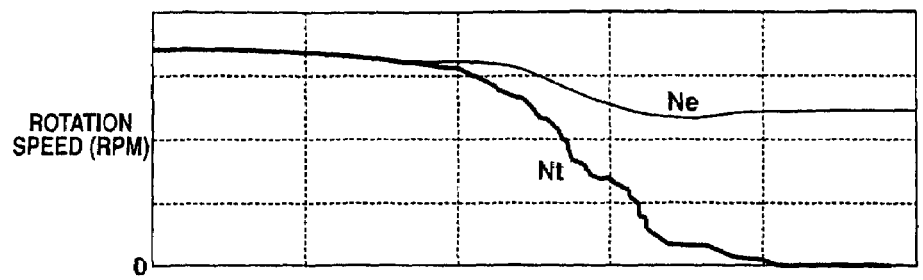
FIGS. 7A to 7D are time charts that depict control characteristics exhibited by a conventional speed change control system.
Figure 7B:
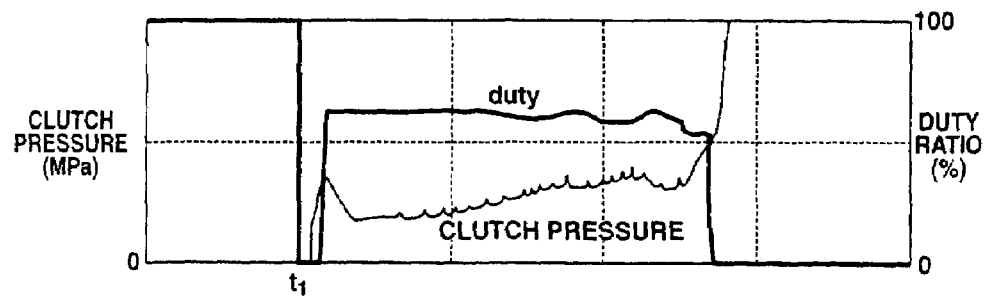
Figure 7C:
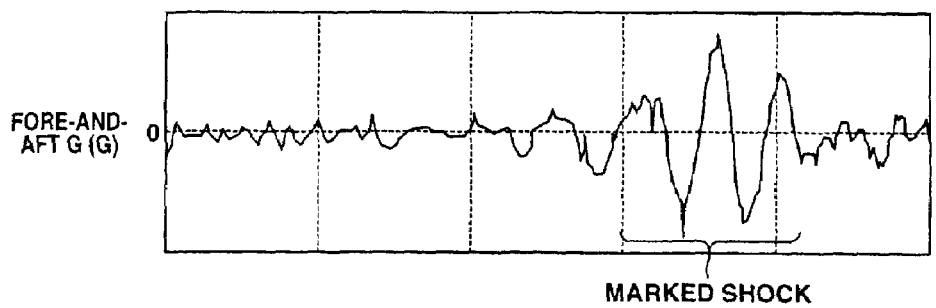
Figure 7D:
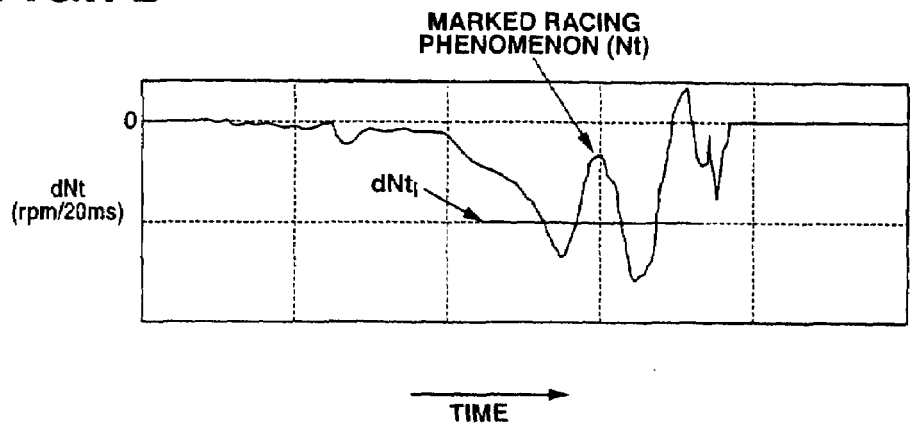

By carrying out the above-mentioned controls, undesired higher speed phenomenon of the turbine shaft 3a and shift shock caused by such higher speed phenomenon are suppressed or at least minimized as is depicted by the time charts of FIGS. 5D and 5C. When comparing the time chart of FIG. 5D with that of FIG. 7D, it will be understood that the fore-and-aft G is remarkably reduced in the invention.

As will be understood from the foregoing description, in the invention, there is no need of adjusting the capacity of accumulator 18 and/or changing the remaining parts of the transmission 2. That is, in the present invention, the control of the transmission 2 is carried out by only changing the control logic and thus increase in cost and that in weight are not induced.

Furthermore, in the present invention, even after the second target rate of speed change "dNtib" is set, the higher speed phenomenon of the turbine shaft 3a is kept monitored, and when it is judged that the turbine shaft 3a shows the tendency of higher speed phenomenon, the feedback control is changed to the open loop control wherein the hydraulic pressure of the clutch 33 is increased at a given rate. Accordingly, even if the higher speed phenomenon of the turbine shaft 3a is of a degree that can not be treated by only the feedback control that is based on the second target rate of speed change "dNtib", the higher speed phenomenon can be suppressed and thus the undesired shift shock is assuredly suppressed or at least minimized.

In the open loop control, the control of the solenoid valve 11 is carried out based on the date that has been previously set in such a manner that the rate of speed change of the input shaft 3a is the second target rate of the speed change, and thus, the hydraulic pressure can be easily and assuredly increased at a given rate.

Furthermore, as is understood from the time chart of FIG. 5D, when, after falling below the target rate of speed change "dNtib", the real rate of the speed change "dNt" of the turbine shaft 3a becomes larger than the target rate "dNtib" and when the deviation "ec" therebetween (viz., "dNtib" and "dNt") becomes lower a given value "dNt" (that is, when |ec|>|dNta|), it is judged that the turbine shaft 3a shows the higher speed tendency. Thus, the higher speed phenomenon of the turbine shaft 3a is assuredly detected.

In the above description, the explanation is directed to a possible shift shock that would take place when, upon shifting of the select lever from N-range to D-range, the transmission 2 is subjected to a speed change from neutral condition to 1$^{st}$ speed. However, the present invention is not limited to such N-D shifting operation. That is, the measures of the present invention may be used for suppressing a shift shock that would be produced when, upon shifting of the select lever from N-range or P-range to P-range or 1$^{st}$ speed hold range, the transmission 2 is subjected to a speed change from neutral condition to reverse or forward speed.

In the above description, the explanation is directed to the automatic transmission of a type having a planetary gear unit. However, the present invention is not limited to such transmission. That is, the automatic transmissions to which the present invention is practically applied may be of any type so long as they can establish a forward speed or a reverse by engaging a frictional element upon switching of the transmission from a non-travel range to a travel range.

The entire contents of Japanese Patent Application 2003-397934 filed Nov. 27, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A speed change control system of an automatic transmission incorporated with an engine, comprising:
   a speed change mechanism that is able to establish a forward speed or a reverse by engaging a hydraulically operated friction element upon switching of the transmission from a non-travel range to a travel range; and a control unit that controls the hydraulically operated friction element in such a manner that a hydraulic pressure applied to the friction element is feedback controlled in such a manner that when the engine is under a lower load condition, a rate of speed change of rotation of an input shaft of the transmission has a first target rate, the control unit being configured to carry out:

setting the rate of speed change of the input shaft to a second target rate smaller than the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

2. A speed change control system as claimed in claim 1, in which the control unit is further configured to carry out:

deriving a real rate of speed change of the input shaft at the time when, upon switching of the transmission from the non-travel range to the travel range, the engine is under the higher load condition;

subtracting the real rate of speed change from the second target rate to derive a deviation;

discontinuing the feedback control of the hydraulic pressure to the friction element when the deviation is changed from positive to negative and the deviation becomes lower than a predetermined value; and starting an open loop control wherein the hydraulic pressure to the friction element is increased at a given rate.

3. A speed change control system as claimed in claim 2, in which the hydraulic pressure of the friction element is controlled by an operation of a clutch solenoid installed in a hydraulic circuit and in which the open loop control is carried out by the clutch solenoid based on data that has been set in such a manner that the rate of speed change of the input shaft has the second target rate.

4. A speed change control system as claimed in claim 1, in which the input shaft of the transmission is connected to a turbine shaft of a torque converter that is operatively interposed between the engine and the transmission.

5. A speed change control system as claimed in claim 1, in which the non-travel range includes N(neutral)-range and P(parking)-range, and the travel range includes D(drive)-range and R(reverse)-range.

6. A speed change control system as claimed in claim 5, in which the non-travel range is the N(neutral)-range and the travel range is $1^{st}$ speed forward range.

7. A speed change control system as claimed in claim 1, in which the control unit judges the load condition of the engine based on a rotation speed of the engine, an ignition timing of the engine and a temperature of engine cooling water.

8. A speed change control system as claimed in claim 1, in which the first target rate is set when the engine is under normal idling condition.

9. A speed change control system as claimed in claim 1, in which the application of the hydraulic pressure to the friction element is carried out through an oil passage to which an accumulator is connected.

10. In an automotive automatic transmission having a speed change mechanism that is able to establish a forward speed or a reverse by feeding a hydraulic pressure to a hydraulically operated friction element upon switching of the transmission from a non-travel range to a travel range, a method of controlling the speed change mechanism, comprising:

setting a rate of speed change of ratio of rotation of an input shaft of the transmission to a first target rate when the engine is under a lower load condition, setting the rate of speed change of the input shaft of the transmission to a second target rate lower than the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

11. A method as claimed in claim 10, further comprising:

deriving a real rate of speed change of the input shaft at the time when, upon switching of the transmission from the non-travel range to the travel range, the engine is under the higher load condition;

subtracting the real rate of speed change from the second target rate to derive a deviation;

discontinuing the feedback control of the hydraulic pressure to the friction element when the deviation is changed from positive to negative and the deviation becomes lower than a predetermined value; and starting an open loop control wherein the hydraulic pressure to the friction element is increased at a given rate.

12. A method as claimed in claim 11, further comprising:

carrying out the open loop control based on data that has been set in such a manner that the rate of speed change of the input shaft has the second target rate.

13. A speed change control system of an automatic transmission powered by an internal combustion engine through a torque converter, comprising:

a speed change mechanism that is able to establish a forward speed or a reverse of the transmission by feeding a hydraulic pressure to a hydraulically operated fiction element upon switching of the transmission from a non-travel range to a travel range, the feeding of the hydraulic pressure to the friction element being carried out through an oil passage to which an accumulator is connected; and a control unit that controls the hydraulic pressure to the friction element in such manner that when the engine is under a lower load condition, a rate of speed change of rotation of an input shaft of the transmission has a first target rate, the input shaft being connected to a turbine of the torque converter;

the control unit being configured to carry out:

setting the rate of speed change of the input shaft to a second target rate smaller than the first target rate when, upon switching of the transmission from the non-travel range to the travel range, the engine is under a higher load condition; and controlling the hydraulic pressure of the friction element in a feedback control manner so that the rate of speed change of the input shaft has the second target rate.

* * * * *